United States Patent Office 3,538,295
Patented Nov. 3, 1970

3,538,295
PLANT FOR RESISTANCE BUTT-WELDING OF PIPES
Boris Evgenievich Paton, Ul. Kotsjubinskogo 9, kv. 21; Vladimir Konstantinovich Lebedev, Ul. Engelsa 25, kv. 12; Vasily Alexeevich Sakharnov, Bulvar Likhacheva 3, kv. 64; Boris Afanasievich Galyan, Ul. Rozy Ljuxemburg 15, kv. 9; Vladimir Ivanovich Tishura, Ul. Nikolaya Gaitsena 6, kv. 7; Stanislav Adgamovich Mansurov, Ul. Gorkogo 62, kv. 6; and Anatoly Dmitrievich Ignatov, Ul. Zhadanovskogo 55, kv. 15, all of Kiev, U.S.S.R.
Filed Mar. 1, 1967, Ser. No. 619,720
Int. Cl. B23k 11/02
U.S. Cl. 219—101    7 Claims

ABSTRACT OF THE DISCLOSURE

A welding device by use of which successive lengths of pipe of a string of pipe in a well may be secured together in lieu of the present unions. The device comprises two clamps mounted in alignment that can be moved toward and away from each other in the axial direction of the pipes, each clamp holding the end of a pipe in alignment coaxial with the other pipe end. The electric current for welding the pipe ends passes to the pipes through the clamps. In use, when the welding current has heated the metal of the pipe ends the two clamps are moved toward each other by hydraulic force to complete the weld. The two clamps and other components of the device are formed as a unit that is suspended by a flexible element from a support that is mounted for movement away from the pipe as the pipe is lowered into the well so it will not be in the way of the well drilling or other operations. The flexibility of the element supporting the device precludes the possibility of misalignment between the two lengths of pipe.

---

The present invention relates to a machine for resistance butt-welding of pipes in the field, in particular for welding drive pipes over the mouth of a bore hole in the process of a continuous lowering of casing strings.

The assembly of separate drive pipes in a casing string by means of threaded unions is known in the art.

With such an assembly, the required sealing of pipe joints is not provided, the strength of the casing string is weak at the threaded joints, and expense for the manufacture of connecting unions and for making threads at the pipe ends is required. The process of screwing unions on the pipes is very difficult in itself.

In connection with the fact that the unions presently used are of a greater diameter than the pipes, the required diameter of a bore hole needs to be increased, and hence the required time and cost of boring operations is increased.

For bore holes of a larger diameter, a greater amount of costly chemical reagents and cement is required.

A further disadvantage of the threaded joint is an excessive consumption of a high-strength alloy metal for the manufacture of pipes, because the design of a casing string for strength is effected by the thickness of the wall of said casing string in its threaded section; as a result, the thickness of the pipe throughout the remaining portions thereof will be greater than required.

In conformity with the above, an object of the present invention is to provide a machine for resistance butt-welding of pipes providing a strong, hermetic sealed joint for drive pipes.

Another object of the present invention is to provide a machine for resistance butt-welding of pipes in a casing string of a uniform cross section throughout its entire length.

A further object of the present invention is the provision of a welding machine, providing for quick and economical connection of drive pipes into a casing string.

To accomplish the foregoing and other objects calls for the provision of a machine for electric resistance butt-welding of pipes into a casing string directly on a boring platform just over the mouth of the bore hole or well upon completion of the boring operation.

To resolve said problem by the machine of the present invention, a frame is mounted on guides so as to be capable of transverse movement to one side in relation to pipes being welded, said frame supporting a welding machine by means of a flexible supporting mechanism adapted to bring said frame up to pipes being welded so as to be capable of moving longitudinally along said pipes. The welding machine is provided with clamping, self-centering fixtures mounted in casings thereof, each of said fixtures being individually provided with contact clamping members complete with a synchronous power drive.

According to one embodiment of the present invention, the flexible mechanism supporting the welding machine comprises ropes connected to the power drive, said ropes being secured on turning levers whose axles of rotation are arranged on one of the casings of the welding machine, secured on a stationary fixed pipe.

It is expedient to manufacture the clamping fixtures in the form of pairs of levers, one end of each lever being provided with contact clamping members, while the other end is mounted to interact with a regulating wedge mounted on the rod of a hydraulic cylinder for clamping pipes to be welded.

The pivots of the clamping fixtures are preferably the rods of the upsetting hydraulic cylinders, that interconnect the casings of the welding machine.

The rods of the upsetting hydraulic cylinders preferably are provided with internal channels for supplying the working fluid in the hydraulic cylinders and draining it therefrom.

It is also recommended that the said rods of the upsetting hydraulic cylinders be encirculated by spark-arresting telescopic springs.

The frame of the device may comprise an upright davit-like structure, erected on a platform, mounted so as to be capable of moving on rail guides, the extremities of which are adapted to be secured on the rotor of a boring installation, while the other extremities are provided with regulating jacks to mount the guides in a horizontal position which allows the entire welding machine to be removed from the boring platform.

The nature of the present invention will become more fully apparent from a consideration of the following description thereof, taken in conjunction with the appended drawings, in which.

Figure 1:
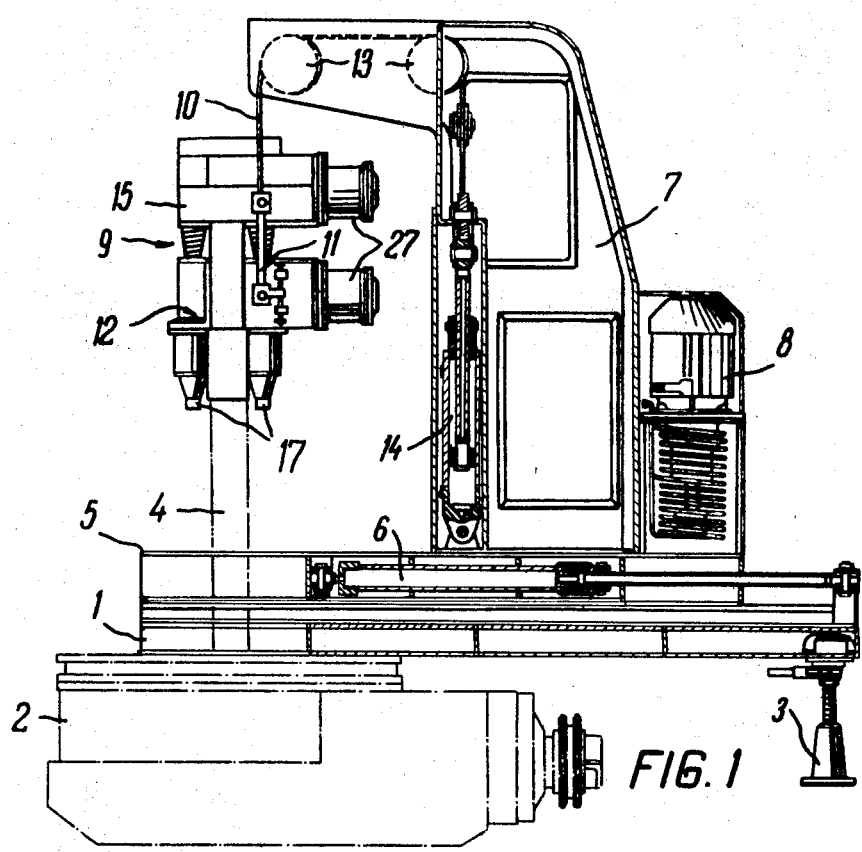
FIG. 1 is a side view of the device for resistance butt-welding of pipes, mounted on the rotor of the boring installation and upon the floor of a boring tower.

The rail guides 1 (FIG. 1) are mounted in a horizontal position on a rotor 2 of the boring installation, on one end, and leveled by means of regulating jacks 3 upon the floor of the boring tower, on the other end.

A frame 5, connected with the rail guides 1 by means of a feeding hydraulic cylinder 6 is mounted on the rail guides 1 so as to be capable of performing transverse movement to one side in relation to a pipe 4 being welded.

All the required hydraulic and electrical appurtenances of the device are provided in an upright 7 rigidly secured on the frame 5. A hydraulic pumping station 8 is mounted on the frame 5 near the upright 7. A welding machine denoted generally 9 is suspended on the upright 7 by means of a rope 10, providing the self-adjustment of the machine along the stationary drive pipe 4. The rope 10 is fastened at one end on a turning lever 11, while its other end is secured on a similar lever provided on the other side of the machine 9.

The axles of the levers are secured on the lower casing 12 of the machine 9. These levers 11 are rotatably mounted to provide for a possibility of varying the point of suspension of the machine and controlling its inclination in conformity with the inclination of the pipe penetrating into the bore hole.

The rope 10 leads over pulleys 13 inside the upright 7 and also engages the pulley of a hydraulic cylinder 14 for moving the machine 9 along the pipe 4 up to the joint thereof.

Hence, the rope 10 also fuctions as a balance means, equalizing the effort actuating the levers 11.

Figure 2:
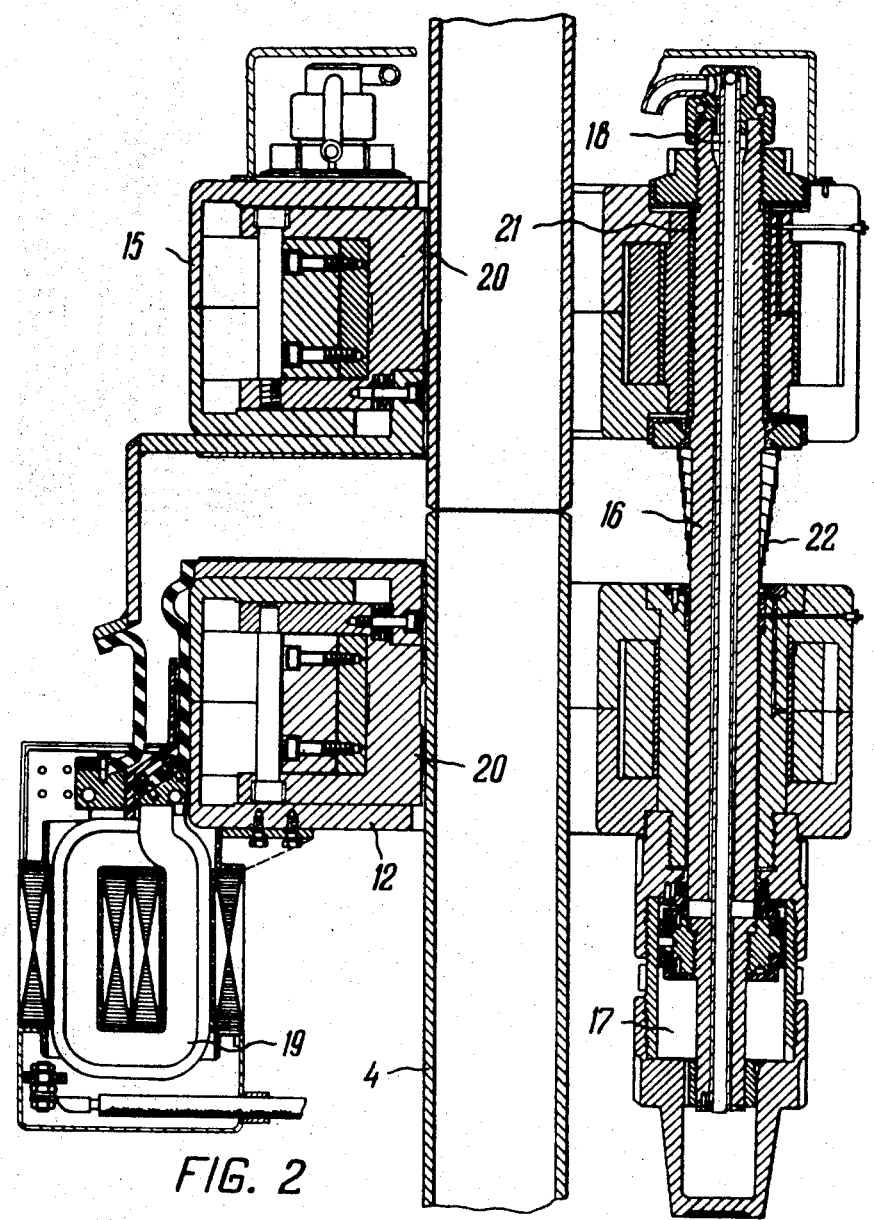
FIG. 2 is a longitudinal section of the welding machine in the device of FIG. 1.

The welding machine 9 (FIGS. 1 and 2) comprises an upper casing 15 and the lower casing 12 that are interconnected but movable relative to each other by means of piston rods 16 of upsetting hydraulic cylinders 17 secured to the lower casing 12. Each rod 16 is provided with an internal bore with a pipe 18 inserted therein to supply oil to the working spaces of the upsetting hydraulic cylinder 17 and to drain the oil therefrom.

Mounted on the lower casing 12 are welding transformers 19, the secondary windings thereof being connected to contact portions of clamping members 20 of the upper casing 15 and lower casing 12.

The upper casing 15 is insulated from rods 16 of the lower casing 12, and hence from the whole device by an insulation member 21.

Figure 3:
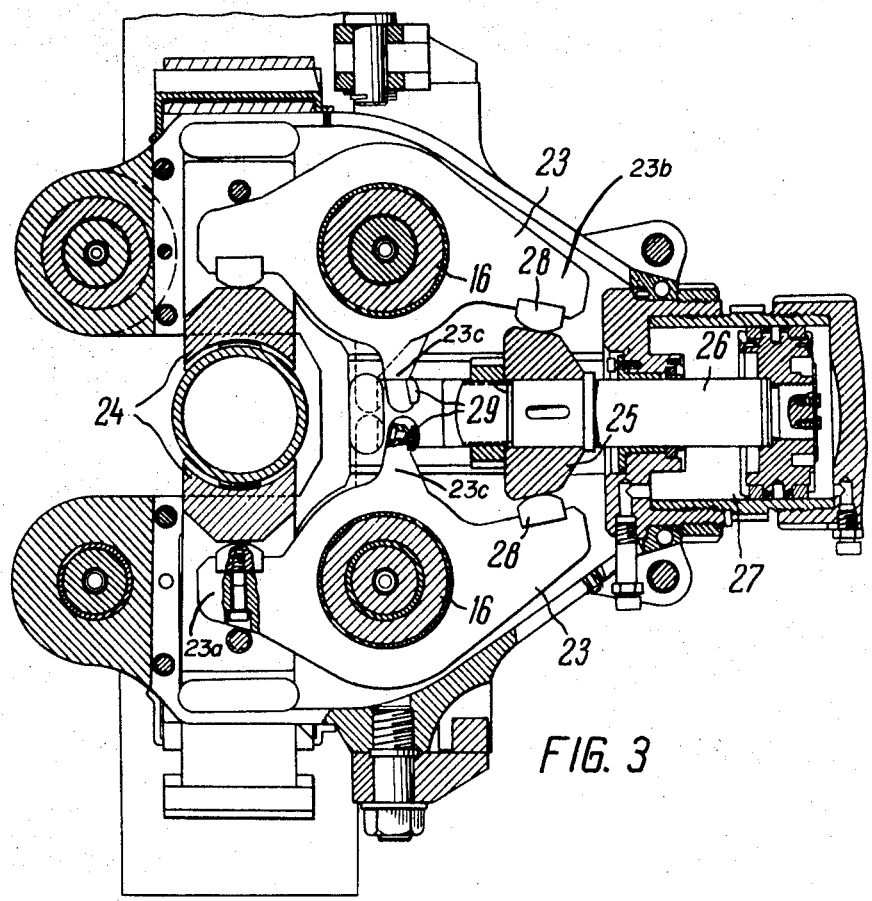
FIG. 3 is a horizontal cross-sectional view of the welding machine illustrated in FIG. 2.

The portions of the rods 16 which are in the welding zone are protected against the sputtering of the molten metal by telescopic springs 22 surrounding the rods. Mounted in the upper casing 15 and lower casing 12 are clamping fixtures which are similar in design. More specifically, the clamping fixtures comprises a pair of levers 23 located in each of the casings 15 and 12 and the levers 23 are capable of rotation relative to the rods 16. As shown in FIG. 3, each lever 23 is provided with arms 25a, 23b, and 23c, and the arms 23a of each pair of associated levers actuate clamping shoes for the pipes by moving the shoes into and out of the casing of the welding machine 9. The shoes 24 in the casing 12 coact with the lowermost pipe while the shoes in the casing 15 cooperate with the pipe to be joined to the lowermost pipe.

It will further be noted that the arms 23b are provided with rollers or the like 28 adapted to bear upon multiangular bevels of a double-sided wedge 25, and the wedge 25 is affixed to piston rod 26 of a horizontally disposed hydraulic clamping cylinder 27. This arrangement serves to actuate the arms 23a to move the shoes 24 into and out of engagement with the pipes.

The multi-angular bevels of the wedge 25 provide a large adjusting run with a small working effort, and a sufficient clamping effort is produced when the rollers 28 of the levers 23 turn through a small angle.

Since the wedge 25 can move only progressively along the axis of the hydraulic clamping cyliner 27, it is employed as a power synchronizer for turning the levers 23, and hence move the clamping shoes 24 to and from the pipe. The clamping fixtures are the same in both casings of the machine, and the levers 23 turning about the rods 16 that are common to both casings ensure their reciprocal centering during the clamping of pipes. The reverse turning of the levers 23 is effected when the end of the moving wedge 25 presses upon projections 29 provided on the arms 23a of the levers 23.

Before welding drive pipes, the welding machine of the invention is mounted on the rotor 2 of the boring installation directly over the bore hole, and is then adjusted horizontally by means of regulating jacks 3. The frame 5 together with the welding machine 9 may be adjusted with respect to the center of the boring platform.

By means of a special closing device pertaining to the equipment of the boring tower from the bridge deck (not shown), the first pipe is gripped and lowered into the bore hole in such a manner that its upper end is approximately on a level with the welding machine. This pipe then is fixed by a clamping fixture in the rotor, and the hoister, being released, grips the next following pipe and maintains it in a suspended position over the first pipe.

The frame together with the welding machine runs onto the pipe, and by means of a mechanisms for the longitundinal displacement the operator adjusts the welding machine along the pipe in such a manner that the joint between the pipes is located in the welding zone.

When the clamping mechanism is activated, the lower pipe is first gripped, by the aid of which the welding machine is centered, and then the upper pipe is gripped, which centers the upper pipe relative to the lower pipe.

Then the welding current is switched on, and the fusion run begins, at the end of which the upsetting operation is to be effected.

The welding operation accomplished, the operator disconnects the clamping mechanism for both casings of the welding machine and returns the frame to its original position.

The welded pipes are lowered into the bore hole. Subsequently, the welding operation is repeated with a successive pipe until the required length of the casing string is obtained.

In spite of the fact that the present description covers only one exemplary embodiment of the invention, it will be evident to those skilled in the art that there may be various modifications of the device that do not depart from the idea and scope of the invention, as defined by the appended claims.

What is claimed is:

1. A device for the resistance butt-welding of pipes and more particularly the butt-welding of drive pipes in the field, comprising guides mounted directly over the mouth of a bore hole, a frame mounted on the guides for transverse movement to one side in relation to pipes being welded, a welding machine having resistance welding electrodes and welding power supply therefor, flexible supporting means carried by said frame and operably connected to the welding machine for enabling the machine to be positioned in operative relationship to and removed from the pipes to be welded and for moving the machine longitudinally along such pipes, said welding machine including two axially spaced casings, means interconnecting said casings for relative movement therebetween, self-centering clamping means mounted in each of said casings, contact clamping members on said self centering clamping means and a synchronous power drive operably connected to said members.

2. The device for the resistance butt-welding of pipes as claimed in claim 1 in which said guides are horizontally disposed, one of said pipes being welded being stationary and one of the casings being secured to such stationary pipe, turning levers pivotally mounted on said one casing, said flexible supporting means including ropes secured to said turning levers, and a power drive operably coupled to the ropes for adjustably displacing the machine along the pipes.

3. A device for the resistance butt-welding of pipes and more particularly the butt-welding of drive pipes, comprising guides mounted directly over the mouth of a bore hole, a frame mounted on the guides for transverse movement from one side in relation to the pipes being welded, a welding machine having resistance welding electrodes and welding power supply therefor, flexible supporting means carried by said frame and operably connected to the welding machine for allowing said machine to execute transverse and longitudinal movements relative to the pipes being welded, said welding machine including two axially spaced casings, means interconnecting the casings for relative movement therebetween, rotatable clamping levers mounted in each of said casings, each clamping lever having at least two ends, contact clamping members operably related with one end of each lever, a hydraulic cylinder for clamping pipes to be welded, a piston rod for the hydraulic cylinder, and a regulating wedge secured to said piston rod and coacting with the other end of each of said clamping levers for turning thereof during the gripping and releasing of a pipe.

4. The device for the resistance butt-welding of pipes as claimed in claim 3 in which said means interconnecting the casings include a hydraulic cylinder for one of said casings and a piston rod displaceable in the cylinder operably connected to the other of said casings.

5. The device for the resistance butt-welding of pipes as claimed in claim 4 in which said piston rod is provided with an internal bore for supplying a working fluid to the cylinder and draining the fluid therefrom.

6. The device for the resistance butt-welding of pipes as claimed in claim 5 in which said piston rod is encircled by a spark-arresting telescopic spring in the area of the working zone.

7. A device for the resistance butt-welding of pipes and more particularly drive pipes comprising horizontal rail guides located directly over the mouth of a bore hole, one end of the guides being adapted to be secured to a rotor of a boring tool; and a regulating jack for the other end of said guides for positioning the guides in a horizontal plane; an upright mounted on said guides so as to be capable of moving in relation to pipes being welded; a welding machine having resistance welding electrodes and welding power supply therefor, said welding machine including two casings movable relative to each other; upsetting hydraulic cylinders having piston rods, said piston rods interconnecting said casings and being provided with internal bores to supply a working fluid to said hydraulic cylinders; spark-arresting telescopic springs encircling said rods in the welding zone; flexible supporting means for suspending said welding machine on said upright; and self-centering, clamping means having a synchronous power drive, with said means being mounted in each said casing of said welding machine for securing it on pipes to be welded.

References Cited
UNITED STATES PATENTS 2,344,939    3/1944    Bennett            219—101
2,459,047    1/1949    Scharf             219—61

ANTHONY BARTIS, Primary Examiner

L. A. SCHUTZMAN, Assistant Examiner

U.S. Cl. X.R.

219—60